UNITED STATES PATENT OFFICE.

MATHIAS CHRISTMAN, OF ST. PAUL, MINNESOTA.

PROCESS FOR CURING SMOKED OR DRIED BEEF.

1,173,411. Specification of Letters Patent. Patented Feb. 29, 1916.

No Drawing. Application filed July 23, 1915. Serial No. 41,516.

*To all whom it may concern:*

Be it known that I, MATHIAS CHRISTMAN, a subject of the Emperor of Germany, residing at St. Paul, in the county of Ramsey and State of Minnesota, have invented new and useful Improvements in Processes for Curing Smoked or Dried Beef, of which the following is a specification.

My invention relates to improvements in the method of curing what is known as smoked or dried beef.

The object of my invention is to shorten the period heretofore required to cure beef of this class.

A further object of the invention is to promote cleanliness and improve and preserve the quality of the product.

The curing of beef, for the purpose indicated, broadly involves three distinct steps: 1st the preliminary dry treatment; 2nd, the corning or pickling in an aqueous solution, and 3rd, the smoking. Hitherto the corning process has usually required from 30 to 60 days. I am able to secure as good or better results in ten days. It has also been usual to smoke the beef for about three days. By reason of the efficiency of the prior steps in my method, I find twelve to fifteen hours sufficient exposure to smoke.

In the practice of my method I take a piece of properly trimmed lean beef, preferably of about 6 pounds in weight, and thoroughly rub it with a dry mixture of sugar, salt and saltpeter, my preferred mixture consisting of salt, three pounds; sugar, ten ounces and saltpeter six ounces. The meat is then thoroughly pounded or beaten to loosen and soften the muscles and sinews and to work the mixture into the beef. I find that in this operation the mixture penetrates an inch and a half below the surface of the meat. The beef is then placed in brine (which I prefer to make in the proportion of 5 gallons water, 8 ounces salt, 6 ounces sugar and 2 ounces saltpeter) and allowed to corn for ten days, which is ample time to allow for six pound pieces of beef. At the end of that time I wash and drain the meat and mold it so that each piece may be incased in a bladder. The product incased in bladders is allowed to dry for about two days and then smoked in the usual manner at a temperature of about 99 degrees Fahrenheit.

Having described my invention what I claim as new and desire to protect by Letters Patent is:

1. The process of curing meat which consists in first pounding into the meat a dry mixture of salt, sugar and saltpeter, then corning the meat in a solution of water, salt, sugar and saltpeter and finally, after washing and drying the meat, smoking it in the usual manner.

2. The process of curing meat wherein the pieces are rubbed with a dry mixture of salt, sugar and saltpeter, or the like, then pounded to cause the mixture to penetrate the meat, then corned in a solution of salt, sugar and saltpeter or the like, then washed and dried and finally smoked in the usual manner.

3. The process of curing meat wherein the pieces are rubbed with a dry mixture of salt, sugar and saltpeter, or the like, then pounded to cause the mixture to penetrate the meat and to make the same flexible, then corned in a solution of salt, sugar and saltpeter or the like, then washed, incased in bladders and dried and finally smoked in said bladders.

4. The process of curing meat which consists in first pounding into the meat a dry preserving mixture, then corning the meat in a pickling solution and finally, after washing, incasing and smoking the pieces of meat in bladders.

In testimony whereof, I have signed my name to this specification in the presence of two subscribing witnesses.

MATHIAS CHRISTMAN.

Copies of this patent may be obtained for five cents each, by addressing the "Commissioner of Patents, Washington, D. C."